United States Patent
Han

[11] Patent Number: 6,009,097
[45] Date of Patent: Dec. 28, 1999

[54] SYSTEM FOR ROUTING PACKET SWITCHED TRAFFIC

[75] Inventor: Yih-Wu Han, Naperville, Ill.

[73] Assignee: Lucent Technologies Inc., Murray Hill, N.J.

[21] Appl. No.: 08/832,645

[22] Filed: Apr. 4, 1997

[51] Int. Cl.[6] ................................................. H04L 12/66
[52] U.S. Cl. ......................................... 370/395; 370/466
[58] Field of Search ..................... 370/466, 467, 370/401, 400, 402, 403, 404, 405, 406, 407, 408, 409, 389, 392, 522, 395, 396

[56] References Cited

U.S. PATENT DOCUMENTS

| | | | |
|---|---|---|---|
| 4,792,941 | 12/1988 | Yanosy, Jr. et al. | |
| 5,623,605 | 4/1997 | Keshav et al. | 370/397 |
| 5,717,691 | 2/1998 | Dighe et al. | 370/401 |
| 5,764,645 | 6/1998 | Bernet et al. | 370/466 |

OTHER PUBLICATIONS

H. Esaki et al., "High Speed Datagram Delivery Over Internet Using ATM Technology", *IEICE Transactions on Communications*, vol. E78–B, No. 8, Aug. 1995, pp. 1208–1217.

E. Roberts, "IP Routing With ATM Speed", *Data Communications*, vol. 26, No. 1, Jan. 1997, pp. 57/58.

R. Tinsley et al., "ATM MPOA Vs. IP Switching", *Data Communications*, vol. 25, No. 12, Sep. 1996, pp. 111/112.

G. Parulkar et al., "a$^t$tPm: A Strategy For Integrating IP With ATM", *Computer Communications Review*, vol. 25, No. 4, Oct. 1, 1995, pp. 49–58.

E. Roberts, "IP ON", *Data Communications*, Mar. 1997, pp. 84–96.

*Primary Examiner*—Huy D. Vu
*Attorney, Agent, or Firm*—Dennis J. Williamson; Jack R. Penrod

[57] ABSTRACT

The system of the invention uses ATM switches as high performance Internet routers by using standard ATM signaling to set up cut-through paths. The cut-through paths are Switched Virtual Paths which are shared with similar flows toward the same destination and a similar Quality of Service (QOS). The concurrency of multiple flows is achieved by using a different Virtual Channel Identification (VCI) for each flow. The cut-through paths are reused to minimize the overhead associated with setting up and tearing down the paths. Depending on the needs of the traffic, different SVCs having different QOS and different bandwidths can be used. Customer service needs and traffic measurements data are used to identify potential cut-through paths. Once a cut-through path is set up, IP mechanisms are used to update the routing tables of related routers and ATM hosts. Specifically, IP protocols' adjacency bring-up procedures and reachability exchanges are used to update routers' routing tables, and ICMP redirect messages are used to update ATM hosts' routing tables. All ATM QOS are available for the cut-through paths.

9 Claims, 2 Drawing Sheets

SYSTEM FOR ROUTING PACKET SWITCHED TRAFFIC

BACKGROUND OF THE INVENTION

The invention relates, generally, to Internet protocol (IP) communication systems and, more particularly, to a communication system that uses ATM switches as routers and ATM standards and existing IP protocols to efficiently route IP traffic.

It will be appreciated that the Internet consists of routers owned by Internet Service providers (ISPs) and/or corporate, educational or other information centers (ICs). The routers are connected by lines that are typically leased from telecommunication companies. Because of the phenomenal growth by the Internet in recent years a tremendous burden is presently being placed on the conventional telecommunications infrastructure to handle Internet traffic.

One existing technology designed to carry voice, data and video is asynchronous transfer mode (ATM) technology. Standard ATM technology packs data into cells where each cell is 53 bytes long consisting of a 5 byte header and a 48 byte payload. The packets are transmitted over virtual channels and virtual paths between destination and source end points as will be understood by one skilled in the art. IP traffic using ATM is packet switched such that each router in the network must examine every packet and the router's controller must perform a flow classification on each cell based on the header address. Because the router controller must examine every packet, the flow classification process creates a bottleneck in the flow of packets thereby decreasing the overall efficiency of the network.

In an effort to eliminate this problem, ATM switch protocols that allow the IP packet traffic to "cut-through" the ATM switch such that the packets bypass the controller and travel through the switch at ATM hardware speed have been developed. Examples of such systems are the Ipsilon Networks, Inc. IP Switch, IBM's Aggregate Route-based IP Switching (ARIS) product and Cisco Systems, Inc. tag switching product. While these systems utilize ATM hardware to effectuate the cut-through path, they do not realize the full benefits of ATM routing functionality. For example, these systems use proprietary protocols to set up cut-through paths. As a result, IP traffic cannot be routed between the switches and routers that are based on different proprietary protocols. Some of these systems also require flow classification of the IP traffic where only certain types of traffic are cut-through. One problem with such systems is that the number of flows could outstrip the number of available virtual circuits. Finally, the known systems, although using ATM hardware, do not make use of ATM software and functionality such that the known systems do not provide ATM QOS (quality of service) end to end.

Thus, an improved system for allowing IP traffic to "cut-through" ATM switches is desired.

SUMMARY OF THE INVENTION

The system of the invention separates incoming traffic between traffic that is to be handled by the receiving router and traffic that is to be forwarded to other network elements from the receiving router. Traffic that is to be handled by the receiving router uses classic IP over ATM to route the traffic to the appropriate destination by providing a flow classification of each packet by the router controller as is known. Traffic that is to be forwarded to other routers from the receiving router uses ATM standards to set up switched virtual paths (SVPs) cutting through network elements. The path setup is switched virtual path (SVP) where different traffic flows can use different virtual channel identifiers (VCIs) on the same SVP. The routing capabilities of Private Network-Network Interfaces (PNNI) and eventually Integrated Network-Network Interfaces (IPNNI) can be used when setting up the common SVPs. The virtual router of Multi-Protocol Over ATM (MPOA) can also be used. Because the overhead of setting up a SVC is typically too great to justify one SVC per flow, SVPs are used. In addition, after a cut-through path is set up, it is reused.

DETAILED DESCRIPTION OF THE INVENTION

The high routing capacity of the invention is accomplished by using ATM signaling (ATM Forum standards—UNI, PNNI and eventually IPNNI) to set up Switched Virtual Paths (SVP) that cut-through routers and switches. Once a cut-through Virtual Path (SVP) is set up, new arrival packets reaching the first switch/router will use the cut-through path, and the intermediate routers on the path will perform only up to ATM layer such that AAL5, IP, and network layer routing will be by-passed. This cut-through path enables all intermediate switch/routers to transport the traffic at hardware speeds. The SVPs are shared among incoming traffic reaching the same switch that has same destination switch and a similar QOS. It will be appreciated that QOS is defined in ATM standards and includes constant bit rate (CBR), available bit rate (ABR), variable bit rate (VBR) and other quality control standards. Using a cut-through path, every flow will use its own virtual path identifier (VPI) and virtual channel identifier (VCI) allowing a SVP to serve concurrent connections. Before a cut-through path is established, the ATM routers use ATM interfaces and IP routing protocols to communicate with one another. The ATM interfaces can be either Classical IP over ATM or LANE or other standard ATM interfaces.

Figure 1:
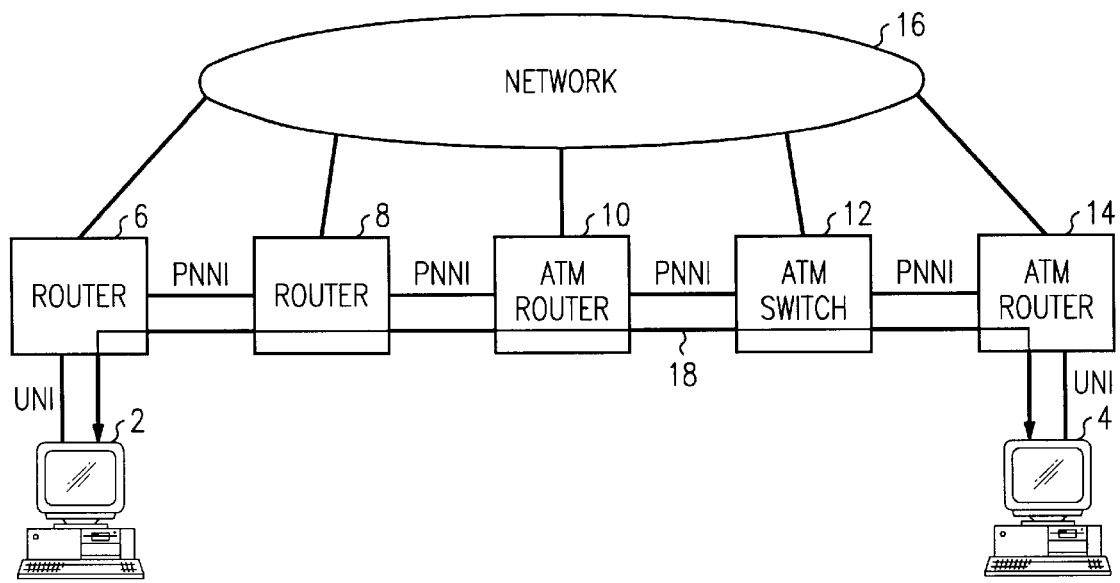
FIG. 1 is a block diagram showing an example network of the type that employs the system of the invention.

To explain the operation of the system, specific reference is made to FIG. 1. FIG. 1 shows a network consisting of a first host terminal (HT) 2 and a second host terminal (HT) 4. Host terminals 2 and 4 can consist of a personal computer, mainframe computer or any other device capable of sending and receiving data packets using ATM. HT 2 is connected to HT 4 via conventional routers 6 and 8, ATM routers 10 and 14 and ATM switch 12. It will be appreciated that the illustrated network is by way of example only and that additional network elements can connect HT 2 to HT 4 and that each of the routers and ATM routers can be connected to other elements in network 16. For purposes of explanation, it is assumed that the routers are connected using standard ATM interfaces (Classical IP over ATM, LANE or the like). The Classical IP over ATM interface is used as the reference model to describe the cut-through path set up, it being understood that the cut-through path setup can be extended to other interfaces.

When packets destined for HT 4 arrives at a ATM router 10 from HT 2 via a default path, the packet is handled as a conventional data packet using the standard protocol stack: ATM, AAL5, and IP Network Layer 3 Packet forwarding such that the first packet is routed to HT 4 where the controllers of each router and switch examines the header address. The ATM router, based on these packets, decides which cut-through paths need to be set up and when these paths are to be set up. The decision process for setting up cut-through paths will be hereinafter described.

To set up the cut-through path, ATM router 10 first converts the IP addresses received in a packet header into ATM addresses. Specifically, the origination and destination IP addresses are input to the Address Resolution Protocol (ARP)/Next Hop Resolution Protocol as is known in the art to convert IP addresses into ATM addresses (either E. 164 or NSAP, depending on the signaling used). Standard ATM signaling UNI 3.1 or UNI 4.0 as defined in "ATM User-Network Interface (UNI) Signaling Specification, Version 4.0," ATM Forum Technical Committee, July 1996, and PNNI as defined in "Private Network-Network Interface, Specification, Version 1.0" (PNNI 1.0), ATM Forum Technical Committee, March 1996 is then used to set up the Switched Virtual Path (SVP) connections based on the ATM addresses. Details of the various types of connections are described hereinafter.

If the first node on the cut-through path is the ATM router, it updates its routing table by adding the cut-through SVP. It is important to note that when a cut-through path is added onto the routing table of the first node, the default path is not removed. But when a new packet arrives and there exists both a default path and a cut-through path for this packet, the cut-through path has priority over the default path such that the new packet will be routed through the cut-through path. This results from that the cut-through path has a lower cost or a shorter distance than that of the default path.

The ATM router uses the Transmission Control Protocol (TCP) or User Datagram Protocol (UDP) port of the incoming packet to select a QOS as is known in the art. The QOS and the destination address of the packet are used in the routing table to choose the outgoing link. If there is a cut-through path, only an ATM port and a VP are designated. The VCI is assigned dynamically and used to distinguish the flow from others sharing the same VP.

It is to be understood that an ATM router need not be the first router on the cut-through path. Thus, the first node on a cut-through path can be (1) a host, (2) a conventional router, or (3) an ATM router. Because the first node performs IP forwarding, the first node typically cannot be an ATM Switch because conventional ATM switches can not perform IP forwarding. An ATM router can be either an ATM attached router or a router with ATM interfaces and fabric. Examples of the latter are Cisco's Tag switches, IBM's Integrated Switch Routers (ISRs in ARIS), and Ipsilon's IP switches. Moreover, a conventional ATM attached router can only be the end nodes of PNNI and can not be intermediate nodes under existing PNNI standard.

There are two sets of routing protocol supported for the IP routing: one set before a cut-through path is set up, another for setting up an ATM cut-through path. Prior to the establishment of an cut-through path, ATM routers use IP routing protocols to interwork with other routers. Those standard IP routing protocols can include Routing Information Protocol (RIP), and Open Shortest Path First (OSPF) for the intra-domain routing, and Border Gateway Protocol (BGP) for the inter-domain routing. When establishing a cut-through path, ATM routing protocols such as PNNI are used, which is based on OSPF but is source and hierarchical routing.

IP routing protocols depend on the establishment of a neighborhood in which neighbors exchange greetings and reachability information with one another. PNNI Routing protocol has its origin from OSPF and has similar functionality. Those neighbors are physically connected to one another. In the context of ATM routers, they connect with one another using default ATM connections. For a cut-through path, the routing table update for routers and ATM Routers is done through the conventional routing protocol's mechanism on bringing up an adjacency. Hence, both end nodes (the first and the last on a cut-through path) need to support the same routing protocol used by the default paths, such as Open Shortest Path First (OSPF), "OSPF Version 2", J. Moy, RFC 1583, March 1994. However, if either the first node or the last node is an ATM host or both of them are, there is no adjacency establishment to be done. It is also important to know that if the first node is a router and the end node is an ATM host, then one needs an extension of standards by sending a message from the ATM Router, which sets up the cut-through path and happens to be an intermediate node, to the first node router to update its routing table. When the first node is an ATM host, the ATM Router which sets up the cut-through path sends an Internet Control Message Protocol (ICMP) redirect message to update the ATM host's routing table.

The first node's routing table update is performed as follows, depending on the combination of the types of the first node and the last node on the cut-through path:

| First Node | Last Node | Routing Table Update |
| --- | --- | --- |
| ATM Router | ATM Router | Routing Protocol's Adjacency Establishment |
| ATM Router | router | Routing Protocol's Adjacency Establishment |
| router | router | Routing Protocol's Adjacency Establishment |
| router | ATM Router | Routing Protocol's Adjacency Establishment |
| ATM host | ATM Router or router | ICMP redirect message |
| ATM Router | ATM host | ATM Router |
| router | ATM host | Use a standard extension |
| ATM host | ATM host | ICMP redirect message |

For routers, once the first node's routing table is updated, the normal routing protocols' reachability exchange enables other nodes of the network update their routing tables.

It is possible that a service provider, based on customer demands and traffic statistics, will know the traffic needs among ATM routers and switches and set up priori cut-through SVPs for end user traffic. Those cut-through paths are Permanent Virtual Paths. Further, cut-through path set up can be a feature which is provisionable in that it can be turned on or off through provisioning. When the feature is turned off, traffic statistics are collected and used to identify which potential cut-through paths may need to be set up.

The process for deciding when to set up a cut-through path will now be described. An ATM router sets up a cut-through path in one of three categories. The first category for a cut-through path is for end-to-end connections. An end-to-end path is from the originating end user to the destination end user where both end users have ATM interfaces. FIG. 1 illustrates an end-to-end cut-through connection 18 where HT 2 and HT 4 both have ATM interfaces.

PNNI is used to set up the cut-through path except for the first and the last nodes, which use either UNI or PNNI. In the illustrated example, the first and the last nodes are host terminals which usually only handle UNI. If the end nodes are routers, the signaling used can be either UNI or PNNI. In this first category, the address resolution results from directly translating the IP originating and destination addresses into ATM addresses.

Figure 2:
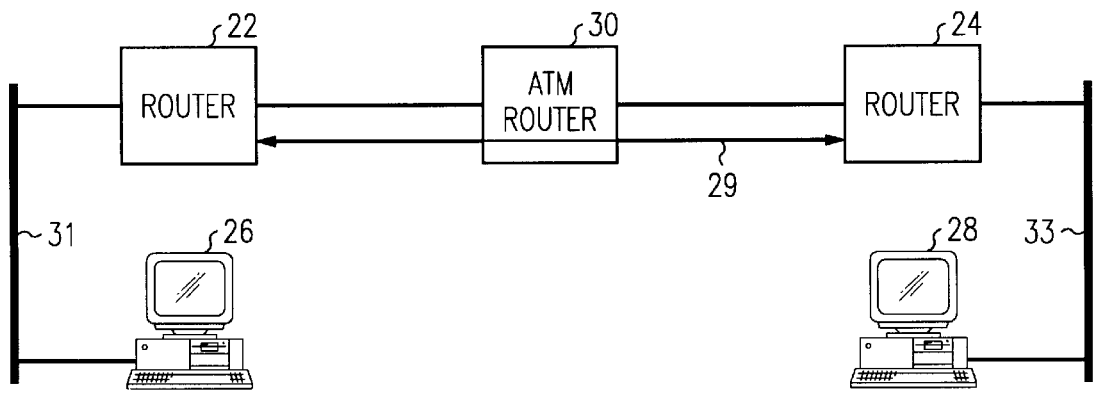
FIG. 2 is a block diagram showing a network illustrating edge-to-edge connections using the system of the invention.

The second category of cut-through path is for edge-to-edge connections. Referring to FIG. 2, the cut-through connection 29 is between the ingress switch/router 22 and the egress switch/router 24 where the end users HT 26 and HT 28 do not have ATM interfaces. It will be appreciated that at least one ATM router 30 is located between the ingress router 22 and egress router 24. The end users are on LANs 31 and 33 or use a dial access to the ATM interfaces or for SVP traffic aggregation. The address mapping in this situation is like the one performed in MPOA standards ("Multi-Protocol Over ATM," Version 1.0, ATM Forum/BTD-MPOA-01:11, February 1997), i.e. the IP originating and destination addresses are translated into the ATM addresses of their direct routers, a direct router is the router attached directly to a host or an end point. In the illustrated example, the IP source address is 24 and the IP destination address is HT 26 and the cut-through path is created between ingress switch/router 22 and egress switch/router 24.

In both the first and second categories of connections described above, situations may exist where, due to a security concern, certain IP domains may not allow cut-through. In these situations cut-through paths can only be set up to the node which performs security checks.

Figure 3:
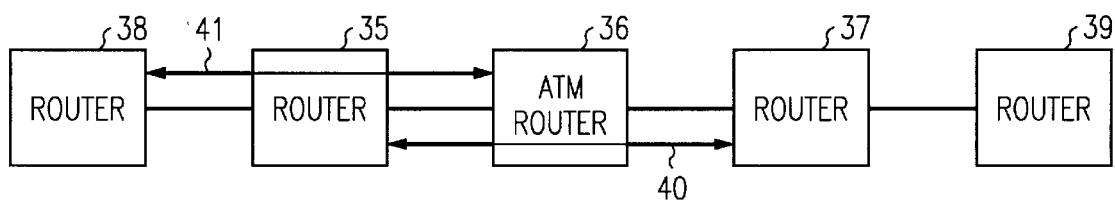
FIG. 3 is a block diagram showing a network illustrating neighbor-to-neighbor connections using the system of the invention.

The third category of cut-through paths is for neighbor to neighbor connections as illustrated in FIG. 3. The cut-through path is from a neighbor router 35 cutting through an ATM router 36 to another neighbor router 37. Other routers 38 and 39 may also be connected to the neighbor routers as illustrated. Since PNNI neighbors exchange their ATM addresses through PNNI routing control channels, ATM router 36 knows its neighbors' ATM addresses directly. In this case, original IP routing protocols (RIP, OSPF, etc.) may be used to determine which pair of neighbors are to be connected by the cut-through path. This process ensures the consistency of the route because the cut-through path and the default path are the same except that the ATM router 36 on the cut-through path does not perform AAL5 and Network Layer activities. Once the routers are identified the path is set up using ATM PNNI.

When an IP packet arrives at ATM router 36 on the default path (i.e., router 35 to ATM router 36), and the IP routing table of ATM router 36 shows that the default path for the packet is to destination router 37, then, when ATM router 36 decides to set up a cut-through path for this packet, it sets up a cut-through path 40 from router 35 to router 37. However, if router 35 happens to be another ATM router, it is then possible that this ATM router will set up another cut-through path 41 from router 38 cutting through router 35 to ATM router 36. By concatenating the first cut-through path from router 35 through ATM router 36 to router 37 with the cut-through path from router 38 to ATM router 36 a cut-through path from router 38 to router 37 is obtained. Before a concatenation is done, the ATM router 32 must ensure that the path is loop free and secure as is known.

Figure 4:
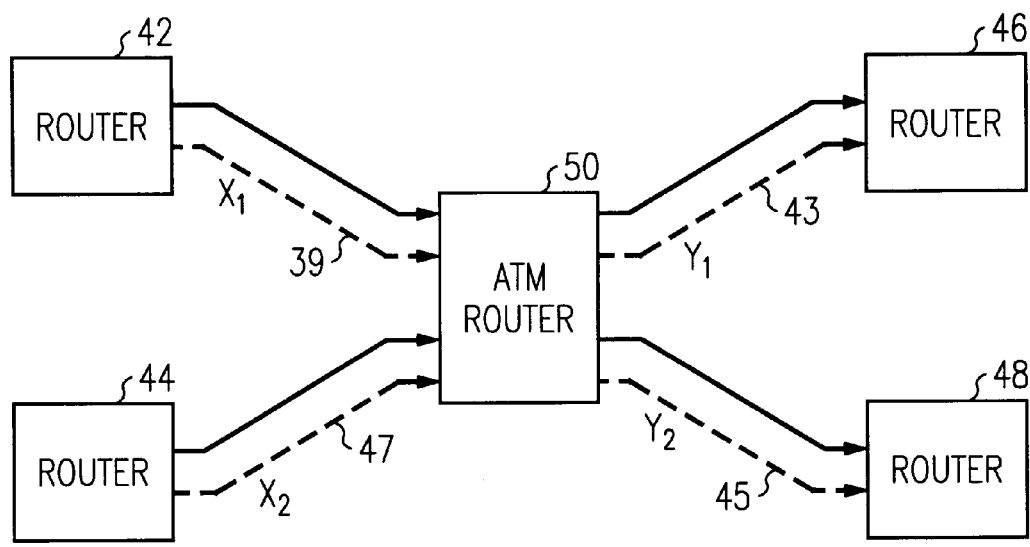
FIG. 4 is a block diagram showing a network illustrating traffic carried between routers without any cut-through paths.

FIG. 4 illustrates traffic carried between routers on default paths before cut-through paths are established. ATM router 50 is connected to four conventional routers 42, 44, 46 and 48. In the illustrated embodiment, routers 42 and 44 forward incoming traffic onto the ATM router 50 and routers 46 and 48 receive forwarded traffic from the ATM router 50. For purposes of simplifying the explanation it is assumed that there is only one QOS type and the traffic is unidirectional.

X1 is the incoming traffic sent on the default path 39 from router 42 to ATM router 50; X2 is the incoming traffic sent on default path 47 from router 44 to ATM router 50; Y1 is the traffic sent on default path 43 from ATM router 50 to router 46; and Y2 is the traffic sent on default path 45 from ATM router 50 to router 48. In the following equations, Xij (or Yij) denotes the traffic from router i to router j. The traffic originating from or terminating onto ATM router 50 is denoted as X0. For example, X42-0 is the traffic from Router 42 to ATM router 50 and X0-46 is the traffic sent from the ATM router 50 to router 46.

Thus, the traffic carried by each default path can be described as follows:

X1=X42-0+X42-46+X42-48 over path 39;

X2=X44-0+X44-46+X44-48 over path 47;

Y1=X42-46+X44-46+X0-46 over path 43; and

Y2=X42-48+X44-48+X0-48 over path 45.

In this example, there are 4 possible neighbor-to-neighbor cut-through connections to be established:

1. From Router 42 to Router 46 with traffic X42-46,
2. From Router 42 to Router 48 with traffic X42-48,
3. From Router 44 to Router 46 with traffic X44-46, and
4. From Router 44 to Router 48 with traffic X44-48.

Figure 5:
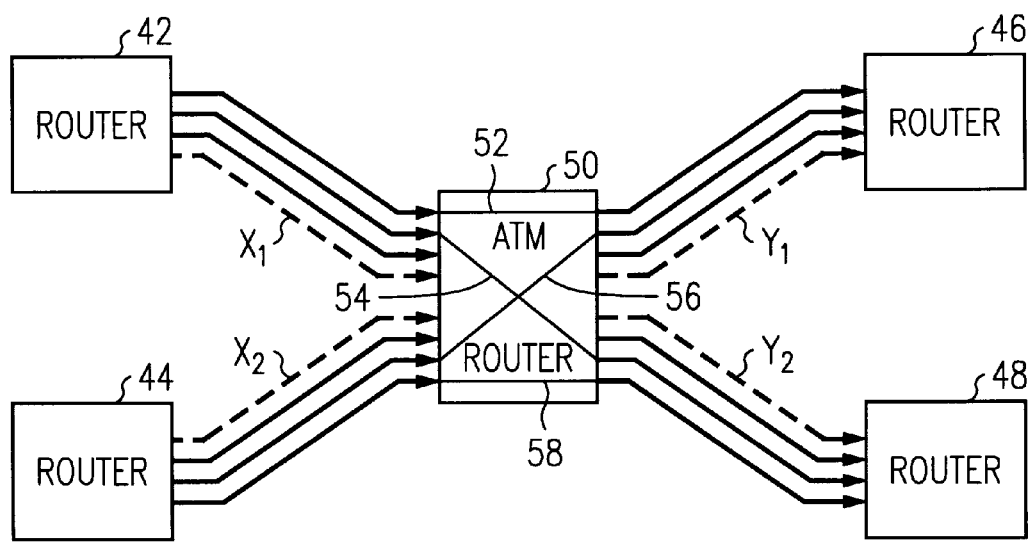
FIG. 5 is a block diagram showing a network illustrating traffic carried between routers after cut-through paths are established.

Referring to FIG. 5, if it is assumed that the first cut-through path 52 is set, Athen, X1=X42-0+X42-48 (the remaining traffic carried by the default path from router 42 to ATM router 50). If it is assumed that the second cut-through path 54 is also set-up, then X1=X42-0 where X42-0 is the only traffic carried over default path X1. If it is assumed that the third cut-through path 56 and fourth cut-through path 58 are also set up, then the original default paths will carry the following traffic:

X1=X42-0;

X2=X44-0;

Y3=X0-46; and

Y4=X0-48.

Thus, after all four cut-through paths have been established, the default paths only carry traffic that terminates at or originates from the ATM router 50. As an ATM switch, the ATM router 50 maintains the cell counts of a path and can monitor the traffic on Xij. As described previously, for the traffic on the cut-through paths, the ATM network performs up to the ATM (layer 2) functionality. But for the default paths, the ATM router performs up to the network layer 3 routing function. When the traffic on X0-46 or X0-48 in the above example becomes high enough, the ATM router can set up edge to edge connections for those paths carrying most traffic.

All ATM standard QOS (CBR, ABR, etc.) are available for the ATM cut-through paths. Using (1) the destination addresses and the TCP/UDP ports, each of which is assigned to a QOS or (2) the IPv6 flow labels of the packets, the ATM router assigns various QOS to the cut-through SVPs.

To determine when to set up a cut-through path, the ATM router maintains a packet count relative to time of incoming packets for the potential cut-through path. Specifically, a cut-through path is identified by IP addresses (only the destination address is needed for the edge ATM router) and QOS types. Two parameters must be accounted for to determine when a cut-through path is to be set up: 1) L the threshold number of received packets over which the cut-through path will be set up, and 2) I the decrement per unit of time (the rate of arrivals). Whenever a packet with the same IP addresses and QOS type (identified by the TCP/UDP port) arrives, a counter is incremented by one. And every unit of time passed, the counter is decremented by the decrement parameter, I. When the count reaches the threshold, L, then the ATM router will initiate the cut-through path setup and zero the count. But the count is continuously incremented by new arrivals from the default path until the cut-through path is up and carries the traffic. The count gives an indication of the arrival rate (I) and can be used to determine the bandwidth. If the threshold of a count, L, is set to 1, then the first arriving packet triggers the establishment of the cut-through path. In this special case, no count needs to be maintained except a list which identifies those potential paths.

After a cut-through path is set up, a time out value is set to determine when to tear down the path. The cut-through path is maintained there until it is timed out. A cut-through path will be timed out and torn down by the first node in the cut-through path, when the path is set up and no packet has arrived before the time expires. If a packet arrives before the expiration, the first node extends the time out value. The parameters are also adjustable by the service provider who owns the node. As previously discussed where cut-through paths are concatenated, if the path is timed out all the routers in the concatenated path must be updated as to the time out value. In addition to the time out parameter, the cut-through paths can also be cached out. Caching out accounts for the situation where any node on the path may have reached an available resource limit and decides to release some resources and tear down a path. The algorithm used to decide which cut-through paths to tear down can be either least recently used path or the path which carries least traffic based on statistical analysis.

Note that the default paths are not removed from the routing tables. As a result, whenever a cut-through path is torn down packets are routed using the default path. The system for setting up the cut-through path is again triggered when another packet arrives such that the system is self-recovering.

While the detailed description focuses on IP, it is to be understood that the system of the invention is applicable to non-IP traffic.

It is to be understood that the above description is only of one preferred embodiment of the invention. Numerous other arrangements may be devised by one skilled in the art without departing from the scope of the invention. The invention is thus limited only as defined in the accompanying claims.

What is claimed is:

1. A method for routing Internet protocol traffic, comprising the steps of:

receiving packets having Internet protocol addresses;

converting the Internet protocol addresses into ATM addresses;

counting the number of packets having a common destination address;

establishing a cut-through switched virtual path or channel using ATM standard signaling when the number of packets having a common destination address exceeds a predetermined threshold.

2. The method of claim 1, wherein the ATM standard signaling is UNI 3.1.

3. The method of claim 1, wherein the ATM standard signaling is UNI 4.0.

4. The method of claim 1, wherein the ATM standard signaling is PNNI.

5. The method according to claim 1, wherein said packets are received at an ATM router, further including the step of transmitting the cut-through path information from said ATM router to a second router.

6. The method according to claim 1, further including the step of decrementing the number by a decrement value per unit time.

7. A method for routing Internet protocol traffic, comprising the steps of:

receiving packets having Internet protocol addresses;

converting the Internet protocol addresses into ATM addresses;

counting the number of packets having a common destination address;

establishing a cut-through switched virtual path or channel using ATM standard signaling when the number of packets having a common destination address exceeds a predetermined threshold;

wherein the switched virtual path supports concurrent streams of data using different virtual channel identifiers.

8. A method for routing Internet protocol traffic, comprising the steps of:

receiving packets having Internet protocol addresses;

converting the Internet protocol addresses into ATM addresses;

counting the number of packets having a common destination address;

establishing a cut-through switched virtual path or channel using ATM standard signaling when the number of packets having a common destination address exceeds a predetermined threshold;

wherein the switched virtual path is set up dynamically based on actual traffic.

9. A method for routing Internet protocol traffic, comprising the steps of:

receiving packets having Internet protocol addresses;

converting the Internet protocol addresses into ATM addresses;

counting the number of packets having a common destination address;

establishing a cut-through switched virtual path or channel using ATM standard signaling when the number of packets having a common destination address exceeds a predetermined threshold;

wherein the switched virtual path is set up statically based on anticipated traffic.

* * * * *